Figure 1:
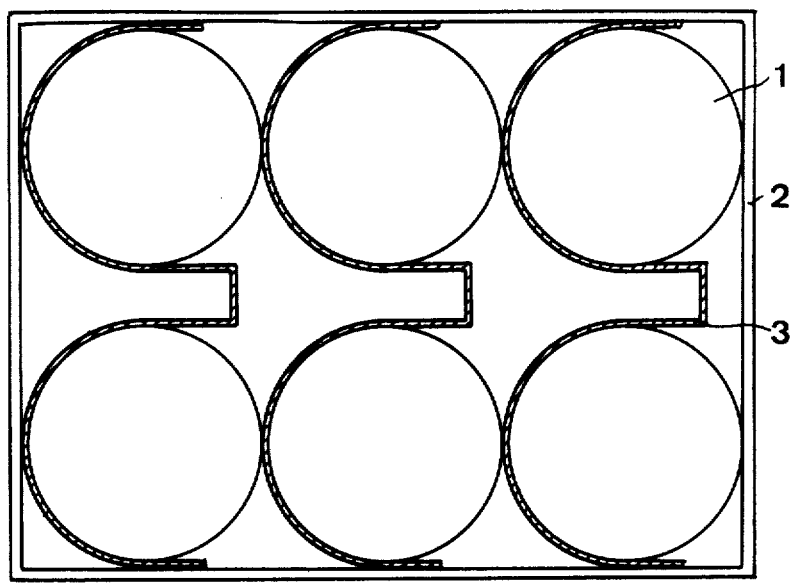

United States Patent [19]

Schmidt

[11] 4,309,739

[45] Jan. 5, 1982

[54] MULTIPLE CONDENSER EQUIPPED WITH COOLING MEANS AND PROCESS FOR ITS MANUFACTURE

[75] Inventor: Jacques Schmidt, Montignies-sur-Sambre, Belgium

[73] Assignee: Societe Anonyme ASEA JUMET, Belgium

[21] Appl. No.: 57,897

[22] Filed: Jul. 16, 1979

[30] Foreign Application Priority Data

Jul. 18, 1978 [EP] European Pat. Off. ........ 78200110.1

[51] Int. Cl.³ .............................................. H01G 1/08
[52] U.S. Cl. .................... 361/274; 29/25.42; 361/314; 361/386
[58] Field of Search ............... 361/272, 274, 314, 318, 361/319, 386, 388; 174/16 HS, 274; 29/25.42

[56] References Cited

U.S. PATENT DOCUMENTS

| | | | |
|---|---|---|---|
| 1,751,939 | 3/1930 | Meissner | 361/314 |
| 3,222,448 | 12/1965 | Rogers | 174/16 HS X |
| 3,238,489 | 3/1966 | Hay | 174/16 HS |
| 3,254,281 | 5/1966 | McClain | 361/274 |
| 4,041,524 | 8/1977 | Trunk | 174/16 HS X |

FOREIGN PATENT DOCUMENTS

| | | |
|---|---|---|
| 1269247 | 5/1968 | Fed. Rep. of Germany . |
| 1045835 | 8/1963 | United Kingdom ............... 361/274 |

*Primary Examiner*—Elliot A. Goldberg
*Attorney, Agent, or Firm*—Schwartz, Jeffery, Schwaab, Mack, Blumenthal & Koch

[57] ABSTRACT

Power condenser comprising stacks (1) of condensers with their armatures connected with external terminals, housed in a box (2), wherein strips (3) which are hood conductors of heat and have widths approximately equal to the height of a condenser stack (1), are bent so as to surround at least one half of the circumference of one or several condenser stacks (1), the two unbent ends of the strips (3) being in contact with two opposing walls of the box (2). The condenser is applicable particularly to low voltages.

8 Claims, 4 Drawing Figures

MULTIPLE CONDENSER EQUIPPED WITH COOLING MEANS AND PROCESS FOR ITS MANUFACTURE

The object of the present invention concerns power condensers, particularly but not exclusively, low voltage condensers, consisting of condenser rolls with their plates connected with external terminals, housed in a metal box and comprising heat conducting sheets in contact with the rolls and the metal box. Such condensers are known in themselves, but require complicated or expensive arrangements, such as the enclosure of the rolls in sheathing or metal boxes, or the provision of springs to assure a certain contact pressure between the heat conducting sheets and the walls of the metal box and the condenser rolls.

It is the object of the invention to insure the effective removal of the heat generated in the rolls of condensers by means of heat conducting sheets of a very simple form, with the introduction of said sheets into the metal boxes facilitating the process of manufacturing rather than complicating it and leading to a rate of assembly operations more rapid than that of condensers which are not equipped with heat conducting sheets.

The condenser according to the invention is characterized by heat conducting sheets consist of strips of an elastic metal, which are good heat conductors. The width of the strips are approximately equal to the height of one condenser rolls and are bent so that each surrounds at least one half of the circumference of each of several rolls of condensers. The two unbent ends of each strip are placed in intimate contact with two opposing walls of the metal box.

It is another object of the invention to provide a process for the manufacture of such condensers, characterized by that the heat conducting metal strips are shaped so that they form one or a plurality of cylindrically bent surfaces. The condenser stacks are clamped into the concave parts of the strips, the strip and condenser roll assembly is compressed and inserted between two opposing walls of the metal box so that the bent strip remains compressed and is forced elastically into tight contact with approximately one half of the surface of each roll and with two opposing walls of the metal box.

The invention will be explained hereinafter with respect to certain examples of embodiment represented in the drawing attached hereto.

Figure 2:
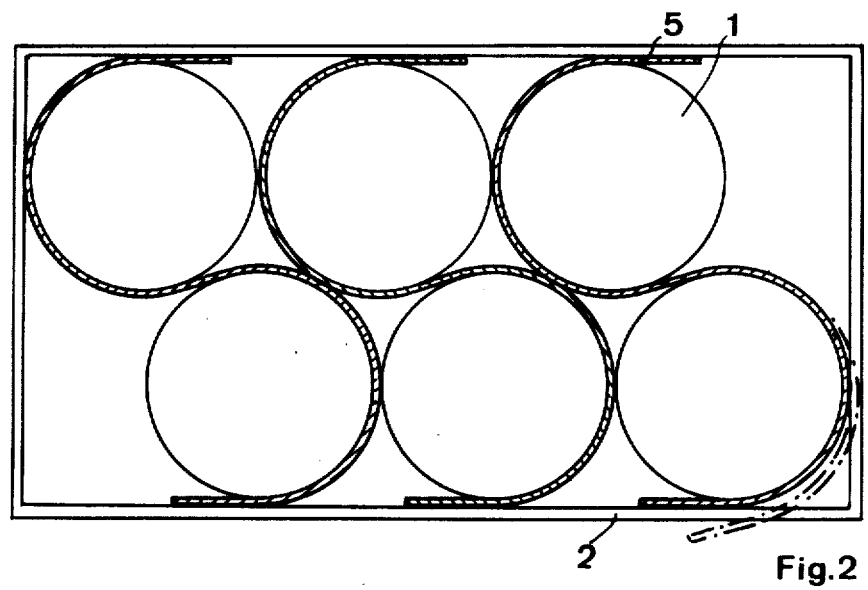
Figure 3:
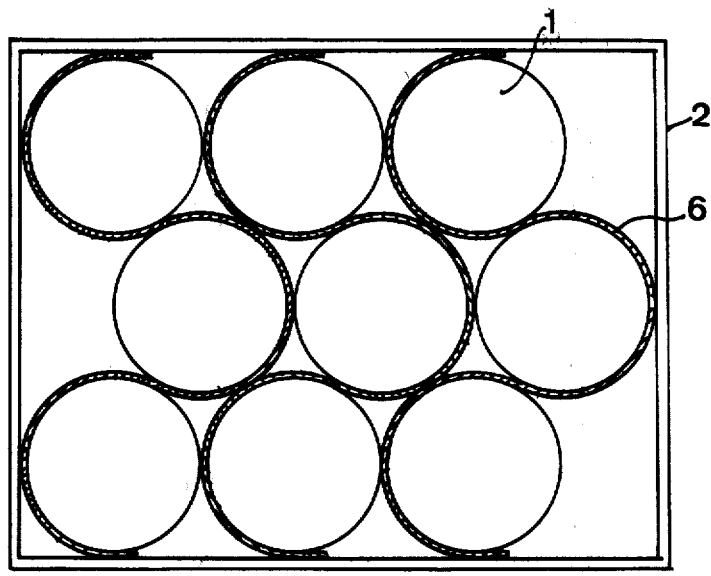

FIGS. 1, 2, 3 of the drawing are sections through condensers consisting of one or a plurality of rolls of condensers.

Figure 4:
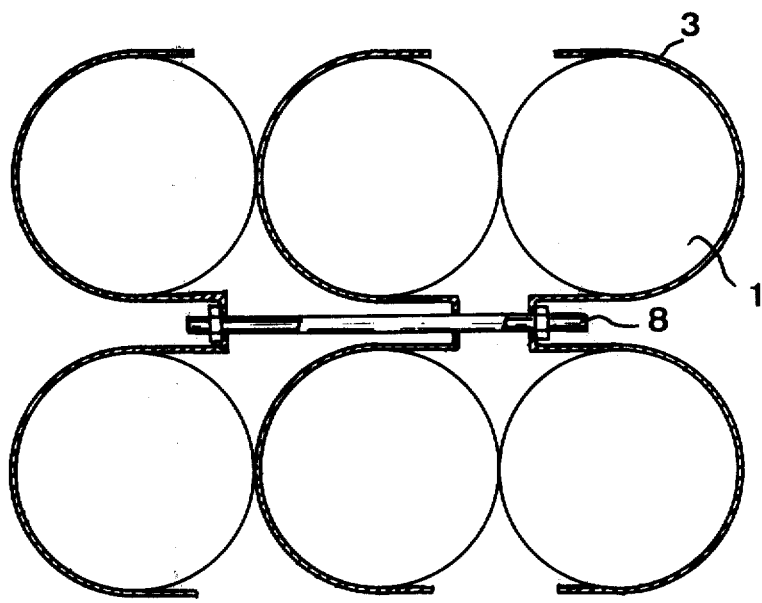

FIG. 4 is a similar section of an assembly of rolls perpendicular to the axes of the rolls, prior to their insertion in the box.

FIG. 1 shows in cross section a condenser comprising six condenser stacks 1, housed in a box 2. The plates, not shown, of the rolls 1 are connected with external terminals, not shown. Each condenser roll 1 is in intimate contact with a strip of heat conducting sheet 3 having a width approximately equal to the height of the roll 1. The strips 3 are bent in a manner so that each surrounds approximately one half of the circumference of each of two rolls 1. The unbent ends of each strip 3 are placed into contact with two opposing walls of the metal box 2. This intimate contact does not exclude a fine electrically insulating layer between the ends of the strips 3 and the walls of the box 2. During the manufacture of the condenser according to FIG. 1, the metal strips 3 are shaped so that they exhibit two cylindrically bent surface parts. The rolls of condenser 1 are retained within the concave parts of the bent strips by means of clamping. During their mounting, two rolls 1 are assembled with each bent strip 3, the assembly comprising the rolls 1 and the strip 3 is compressed in the direction of bringing together the unbent ends of the strip 3 and the compressed assembly is inserted between two opposing walls of the box 2. In this manner, the strip 3 remains compressed between the two walls and is forced elastically into contact with approximately one half of the surface of each stack and with the two opposing walls of the metal box. Because of the contact pressure exercized by the elasticity of the compressed strips 3, the heat is removed by the strips 3 toward the walls of the box 2, even when the spaces between the rolls are filled with a thermally insulating substance, such as for example, vermiculite powder and even if a thin layer of an electrically insulating substance is interposed between the strips and the walls of the box 2.

The strips 3 may consist of any metal having adequate elasticity and a sufficiently large coefficient of thermal conductivity, for example copper, aluminum, steel, etc. Because of its low specific gravity and its excellent thermal conductivity, aluminum is particularly well suited. Aluminum strips have sufficient elasticity and are not susceptible of corrosion.

The spaces between the rolls may be filled particularly with vermiculite powder.

In an another embodiment shown in FIG. 2, the strips 4 are bent not in a double C as in FIG. 1, but in the shape of an S, surrounding only a little more than one half of the circumference of each roll. In an embodiment shown in FIG. 3, the strips 6, bent in a double S, are each assembled not with 2 but with 3 rolls 1 and inserted by set of three rolls 1 in the box 2.

It should be noted that the manufacturing process of the condensers are described hereinabove are particularly advantageous when the opposing walls of the metal box 2 are at a distance of the span of a hand or 20 cm, so that the assemblies of the bent strips and rolls may be grasped and compressed by one hand and inserted in the box.

It is equally advantageous, particularly in the case of strips bent in the shape of a double C, to first assemble all of the rolls that are to be introduced in the box by means of clamping them in the concaves of strips bent in the shape of a double C and by assembling them by means of a tierod 8 as shown in FIG. 4.

In the case of a mode of assembly according to FIGS. 1 to 3, it is possible to preassemble the entire unit by binding it with a turn of an electrically insulating tape.

I claim:
1. A power condenser assembly comprising:
   (a) a metal housing having at least two walls,
   (b) a plurality of capacitor rolls, and
   (c) a plurality of heat conducting sheets, said sheets extending in one direction along substantially the entire length of said rolls, and bent so that each sheet is in contact with at least one-half of the circumference of at least one of said plurality of capacitor rolls so as to form a concave surfaces containing said at least one roll, each sheet having two substantially straight end portions resiliently contacting said at least two walls of said metal housing, said sheets bent in a shape corresponding to one of (1) a double C, one placed above the other, (2) an S, and (3) a double S, whereby said rolls are secured by said sheets.

2. A power condenser assembly as recited in claim 1, wherein said metal housing has two pairs of opposing walls and said end portions of each sheet resiliently contact one pair of opposing walls.

3. A power condenser assembly as recited in claim 2, wherein spaces between said rolls are filled with vermiculite powder.

4. A power condenser assembly as recited in claim 1, 2 or 10, wherein said sheets are bent in the shape of a double C, one placed above the other.

5. A power condenser assembly as recited in claim 1, 2 or 3, wherein said sheets are bent in the shape of an S.

6. A power condenser assembly as recited in claim 1, 2 or 3, wherein said sheets are bent in the shape of a double S.

7. A method of manufacturing a power condenser having condenser rolls and comprising the steps of:
 (a) bending strips of heat-conducting sheet metal so as to have at least two bent cylindrical surfaces forming at least two concave parts for each strip;
 (b) gripping condenser rolls in the concave parts of the bent strips;
 (c) compressing the assembled strips and the capacitor rolls; and
 (d) inserting the compressed and assembled strips and rolls between two opposite walls of a metal box so that the bent strips remain compressed and reliliently pushed into close contact with about half the surface of each roll and with the two opposite walls of the metal box.

8. A method of manufacturing a power condenser as recited in claim 7, further comprising the step of gripping the rolls in the concave parts of the strips to form a unit before insertion into the box.

* * * * *